United States Patent
Seo et al.

(10) Patent No.: US 12,535,689 B2
(45) Date of Patent: Jan. 27, 2026

(54) DISPLAY APPARATUS PROVIDING EXPANDED EYE BOX

(71) Applicant: SAMSUNG ELECTRONICS CO., LTD., Suwon-si (KR)

(72) Inventors: Wontaek Seo, Yongin-si (KR); Daeho Yang, Suwon-si (KR); Sunil Kim, Seoul (KR); Bongsu Shin, Seoul (KR); Geeyoung Sung, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 607 days.

(21) Appl. No.: 17/707,430

(22) Filed: Mar. 29, 2022

(65) Prior Publication Data

US 2023/0134565 A1 May 4, 2023

(30) Foreign Application Priority Data

Nov. 2, 2021 (KR) .......... 10-2021-0148479

(51) Int. Cl.
- *G03H 1/26* (2006.01)
- *G02B 27/00* (2006.01)
- *G02B 27/01* (2006.01)

(52) U.S. Cl.
CPC ..... *G02B 27/0179* (2013.01); *G02B 27/0093* (2013.01); *G02B 27/0172* (2013.01); *G02B 2027/0174* (2013.01); *G02B 2027/0178* (2013.01); *G02B 2027/0187* (2013.01)

(58) Field of Classification Search
CPC ............ G02B 27/0179; G02B 27/0093; G02B 27/0172; G02B 2027/0174; G02B 2027/0178; G02B 2027/0187; G02B 27/0103; G02B 5/32; G03H 1/268
USPC .................................................. 359/15, 630
See application file for complete search history.

(56) References Cited

U.S. PATENT DOCUMENTS

| | | |
|---|---|---|
| 8,390,933 B2 | 3/2013 | Tanaka et al. |
| 8,810,481 B2 | 8/2014 | Hayashibe et al. |
| 8,934,160 B2 | 1/2015 | Sun |
| 9,195,068 B2 | 11/2015 | Mizoguchi et al. |
| 10,254,547 B2 | 4/2019 | Tremblay et al. |

(Continued)

FOREIGN PATENT DOCUMENTS

| | | |
|---|---|---|
| EP | 3296797 A1 | 3/2018 |
| KR | 10-2020-0063645 A | 6/2020 |

(Continued)

OTHER PUBLICATIONS

Communication dated Nov. 23, 2022 issued by the European Patent Office in application No. 22176840.1.

(Continued)

*Primary Examiner* — Audrey Y Chang
(74) *Attorney, Agent, or Firm* — Sughrue Mion, PLLC

(57) ABSTRACT

A display apparatus may include: an image generator configured to generate an image by using light; a holographic optical element configured such that when a single image is incident as reference light on the holographic optical element, the holographic optical element focuses a plurality of images corresponding to the single image on spatially different points as signal light; and an image deflector configured to deflect the image received from the image generator to the holographic optical element in a given direction.

14 Claims, 16 Drawing Sheets

(56) References Cited

U.S. PATENT DOCUMENTS

| | | | |
|---|---|---|---|
| 10,809,664 B2 | 10/2020 | Seo et al. | |
| 11,143,868 B2 | 10/2021 | Seo et al. | |
| 2010/0033782 A1* | 2/2010 | Olaya | G03H 1/2294 |
| | | | 359/9 |
| 2013/0016413 A1* | 1/2013 | Saeedi | G02B 27/01 |
| | | | 359/205.1 |
| 2017/0153443 A1* | 6/2017 | Carminati | G02B 26/101 |
| 2018/0067321 A1 | 3/2018 | Alexander et al. | |
| 2018/0129052 A1 | 5/2018 | Morrison | |
| 2018/0129053 A1* | 5/2018 | Morrison | G02B 27/0966 |
| 2018/0129166 A1* | 5/2018 | Seo | G03H 1/268 |
| 2018/0142840 A1* | 5/2018 | Kurashige | G02B 26/12 |
| 2018/0292660 A1 | 10/2018 | Eastwood | |
| 2020/0033614 A1* | 1/2020 | Shi | G02B 27/30 |
| 2020/0142355 A1 | 5/2020 | An et al. | |
| 2021/0124171 A1 | 4/2021 | Kim et al. | |
| 2021/0191123 A1 | 6/2021 | Leister et al. | |
| 2022/0082831 A1 | 3/2022 | Seo et al. | |
| 2022/0171186 A1 | 6/2022 | Seo et al. | |

FOREIGN PATENT DOCUMENTS

| | | |
|---|---|---|
| KR | 10-2021-0048946 A | 5/2021 |
| WO | 2018/151807 A1 | 8/2018 |

OTHER PUBLICATIONS

Kim, S.-B., et al., "Optical see-through Maxwellian near-to-eye display with an enlarged eyebox", Optics Letters, vol. 43, No. 4, Feb. 15, 2018, XP055980496, pp. 767-770.

"More than meets the eye: Bosch enables the next generation of smartglasses", 2019, Bosch Sensortec, 5 pages total, https://www.bosch-sensortec.com/news/smartglasses.html.

"Smartglasses Light Drive Your single-source, all-in-one, all-day solution", 2019, Bosch Sensortec, 2 pages total.

* cited by examiner

DISPLAY APPARATUS PROVIDING EXPANDED EYE BOX

CROSS-REFERENCE TO RELATED APPLICATION

This application is based on and claims priority under 35 U.S.C. § 119 to Korean Patent Application No. 10-2021-0148479, filed on Nov. 2, 2021, in the Korean Intellectual Property Office, the disclosure of which is incorporated by reference herein in its entirety.

BACKGROUND

1. Field

The present disclosure relates to a display apparatus providing an extended eye box.

2. Description of the Related Art

Head-mounted displays (HMDs), which may be worn on the head in front of the eyes like glasses to view images, have reached the commercialization stage and are being widely used in the entertainment industry. In addition, HMDs have been developed into forms applicable in the medical, educational, and industrial fields.

HMDs are used in various applications such as virtual reality (VR) and augmented reality (AR).

In addition, methods for expanding a field of view or a view region (eye box) of an HMD in which users view images have been continuously researched.

SUMMARY

One or more example embodiments provide display apparatuses capable of providing expanded eye boxes or expanded fields of view.

According to an aspect of an example embodiment, a display apparatus may include: an image generator configured to generate an image by using light; a holographic optical element configured, when a single image is incident on the holographic optical element, output a plurality of images corresponding to the single image at spatially different points by focusing the single image on the spatially different points; and an image deflector provided in an optical path between the image generator and the holographic optical element, and configured to deflect the image received from the image generator to the holographic optical element.

The plurality of images may be focused on an identical plane or on an identical focal plane.

A distance between the plurality of images focused by the holographic optical element may be equal to or greater than a user's pupil size.

A distance between the plurality of images focused by the holographic optical element may be about 2 mm to about 10 mm.

The single image and the plurality of images may have substantially identical optical characteristics.

The holographic optical element may be configured such that: when the single image is incident on the holographic optical element in a first direction, the holographic optical element focuses the plurality of images such that a center of the plurality of images is at a first position; and when the single image is incident on the holographic optical element in a second direction that is different from the first direction, the holographic optical element focuses the plurality of images such that the center of the plurality of images is at a second position that is different from the first position.

The first position and the second position may be located on an identical focal plane.

A distance between the first position and the second position may be greater than or equal to a user's pupil size.

The display apparatus may further include an optical system including one or more lenses, wherein the optical system may be provided between the image generator and the image deflector and configured to cause all light included in the image output from the image generator to be incident on the image deflector.

The holographic optical element may include: a first surface on which the single image is incident and from which the plurality of images are output; and a second surface which is opposite to the first surface and on which external light corresponding to an external environment is incident.

The image generator may be integrated with the image deflector.

The display apparatus may further include a processor configured to adjust a deflection direction of the image deflector by controlling at least one of the image generator, the image deflector, and the holographic optical element.

The at least one of the image generator, the image deflector, and the holographic optical element is biaxially driven to adjust the deflection direction.

The processor may be further configured to apply a distortion compensation algorithm to image information, which is used by the image generator to generate the image, to compensate for image shape distortion caused by a biaxial drive mechanism of the at least one of the image generator, the image deflector, and the holographic optical element.

The distortion compensation algorithm may be performed by inversely transforming a mapping algorithm that maps pixel position information included in the image information to pixel position information included in the plurality of images focused by the holographic optical element.

The display apparatus may further include an eye tracking sensor configured to track a user's gaze, wherein the processor may be configured to control at least one of the image generator, the image deflector, and the holographic optical element based on tracking results received from the eye tracking sensor.

The processor may be further configured to periodically vary the deflection direction with time by controlling at least one of the image generator, the image deflector, and the holographic optical element.

The image generator may include: a plurality of light sources each configured to emit light; and a spatial light modulator configured to generate the image using the light emitted from at least one of the plurality of light sources.

The display apparatus may further include a head-mounted display.

According to another aspect of an example embodiment, a method of controlling a display apparatus may include: generating a single image by applying a distortion compensation algorithm to compensate for image shape distortion caused by a deflection angle adjustment of the display apparatus; projecting the single image to an image deflector by using light; and deflecting the single image to spatially different points on a surface of an holographic optical element, by adjusting a tilt angle of the image deflector, to generate a plurality of images corresponding to the single image at the spatially different points, wherein the deflection angle adjustment is performed by adjusting the tilt angle of the image deflector.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
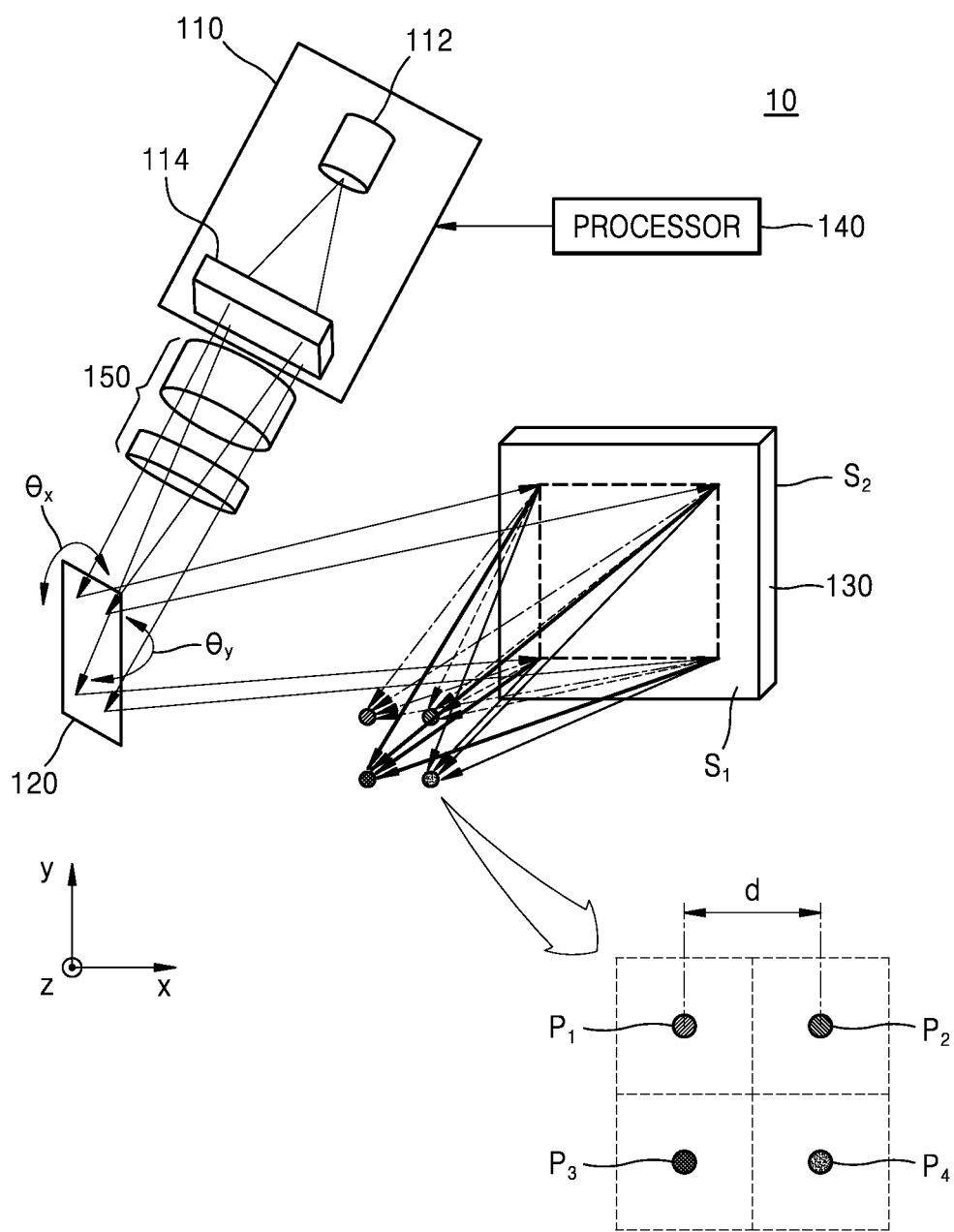
FIG. 1 is a schematic view illustrating a configuration of a display apparatus according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Although the terms "first," "second," etc. may be used herein to describe various components, these components should not be limited by these terms. These terms are only used to distinguish one element from another.

The terms of a singular form may include plural forms unless otherwise mentioned. It will be further understood that the terms "comprises" and/or "comprising" used herein specify the presence of stated features or elements, but do not preclude the presence or addition of one or more other features or elements.

In the drawings, the sizes of elements may be exaggerated for clarity of illustration. In addition, when a material layer is referred to as being "above" or "on" a substrate or another layer, it may be directly on the substrate or the other layer while making contact with the substrate or the other layer or may be above the substrate or the other layer with a third layer therebetween. In the following descriptions of the embodiments, a material of each layer is merely an example, and another material may be used.

In the present disclosure, terms such as "unit" or "module" may be used to denote a unit that has at least one function or operation and is implemented with hardware, software, or a combination of hardware and software.

Specific executions described herein are merely examples and do not limit the scope of the present disclosure in any way. For simplicity of description, other functional aspects of conventional electronic configurations, control systems, software and the systems may be omitted. Furthermore, line connections or connection members between elements depicted in the drawings represent functional connections and/or physical or circuit connections by way of example, and in actual applications, they may be replaced or embodied as various additional functional connections, physical connections, or circuit connections.

An element referred to with the definite article or a demonstrative determiner may be construed as the element or the elements even though it has a singular form.

FIG. 1 is a schematic view illustrating a configuration of a display apparatus 10 according to an example embodiment. Referring to FIG. 1, the display apparatus 10 may include: an image generator 110 configured to generate images; an image deflector 120 configured to deflect an image received from the image generator 110 in a specific direction; and a holographic optical element 130 configured such that when a single image is incident as reference light on the holographic optical element 130, the holographic optical element 130 may focus a plurality of images corresponding to the single image on spatially different points. The display apparatus 10 may further include: a processor 140 configured to provide an image signal to the image generator 110 or control the direction of an image incident on the holographic optical element 130; and an optical system 150 that may be arranged in an optical path between the image generator 110 and the image deflector 120 to cause all light included in an image output from the image generator 110 to be incident on the image deflector 120. The optical system 150 may include one or more lenses.

The image generator 110 may include a light source 112 and a spatial light modulator 114.

The light source 112 may be a coherent light source configured to emit coherent light. For example, a laser diode (LD) may be used as the light source 112 to provide light having high coherence. In addition, the light source 112 may be a light-emitting diode (LED). Although LEDs emit light having lower spatial coherence than lasers, light having a certain degree of spatial coherence may be sufficiently diffracted and modulated by the spatial light modulator 130. Besides LEDs, any other light source may be used as the light source 112 as long as the light source is capable of emitting light having spatial coherence.

The light source 112 may be a point light source configured to emit divergent light. The point light source such as an LED or LD may directly emit light to the spatial light modulator 114. Alternatively, the point light source may be arranged elsewhere, and light emitted from the light source may be provided to the spatial light modulator 114 through an optical fiber. The light source 112 may include a plurality of LDs or a plurality of LEDs that are respectively configured to provide red light, green light, and blue light.

The spatial light modulator 114 may generate an image using light according to image information provided from the processor 140. The image may be a two-dimensional (2D) image or a three-dimensional (3D) image. For example, the image information may be a computer-generated hologram (CGH) signal, and the spatial light modulator 114 may form a hologram pattern according to the CGH. Light output from the light source 112 and incident on the spatial light modulator 114 may be diffracted by the hologram pattern formed by the spatial light modulator 114, and thus a holographic image may be formed. The spatial light modulator 114 may be any one of a phase modulator capable of performing only phase modulation, an amplitude modulator capable of performing only amplitude modulation, and a complex modulator capable of performing both phase and amplitude modulation. For example, the spatial light modulator 114 may be a liquid crystal on silicon (LCoS) modulator, a digital micromirror device (DMD), or a semiconductor modulator.

The image deflector 120 may deflect an image output from the image generator 110 such that the image may be incident on the holographic optical element 130 in a given direction. Examples of the image deflector 120 may include a transmissive deflector configured to deflect an incident image while transmitting the incident image, and a reflective deflector configured to deflect an incident image while reflecting the incident image light. The image deflector 120 will be described later in further detail.

When a single image is incident on the holographic optical element 130, the holographic optical element 130 may focus a plurality of images corresponding to the single image on spatially different points.

In the holographic optical element 130, a hologram pattern may be previously formed using reference light and signal light. The signal light may be holographically recorded on the holographic optical element 130 by the reference light, and may be output from the holographic optical element 130 by light having the same optical characteristics as the reference light. For example, when a plurality of first signal light beams having different focus information and a first reference light beam having first optical characteristics are incident on the holographic optical element 130, interference patterns between the plurality of first signal light beams and the first reference light beams may be recorded on the holographic optical element 130 by a hologram method. The hologram method includes a transmission method, a reflection method, a floating method, and the like, and any of these methods may be used. Thereafter, when a light beam having the same optical characteristics or substantially the same optical characteristics as the first reference light beam is incident on the holographic optical element 130, only the first signal light beams among signal light beams recorded on the holographic optical element 130 may be output.

In addition, the signal light is output while responding to only light having the same optical characteristics or substantially the same optical characteristics as the reference light used when the signal light is recorded, but does not respond to light having optical characteristics different from the reference light. Therefore, external light, which corresponds to an external environment and is incident on the holographic optical element 130, may pass through the holographic optical element 130 without reacting with the holographic optical element 130.

Then, a user may view virtual reality (VR) or images containing virtual information together with background subjects of the real world which the user actually faces. Therefore, the display apparatus 10 of the present embodiment may be used to implement augmented reality (AR) or mixed reality (MR). In particular, the display apparatus 10 of the present embodiment may be implemented as a near-eye AR display apparatus.

The holographic optical element 130 of the embodiment may be of a reflective type. For example, the holographic optical element 130 may include: a first surface S1 from which a plurality of images are output when an image is incident from the image deflector 120; and a second surface S2, which is opposite to the first surface S1 and on which external light corresponding to an external environment is incident. However, the holographic optical element 130 is not limited thereto. The holographic optical element 130 may be of a transmissive type.

The wavelength selectivity and angle selectivity of the holographic optical element 130 may be controlled by adjusting the thickness and refractive index of a material of the holographic optical element 130. The holographic optical element 130 may include a non-volatile material. For example, the holographic optical element 130 may include a material including at least selected from the group consisting of a photo-polymer and inorganic crystals. The thickness of the holographic optical element 130 may be within a range of about 1 mm to about 10 mm. For example, about 500 signal light beams may be recorded in a photo-polymer having a thickness of about 3 mm by using reference light having a bandwidth of about 0.1 nm, and about 500 signal light beams may be recorded in a photo-polymer having a thickness of about 5 mm by using reference light having a bandwidth of about 0.05 nm.

As described above, when an image is incident as reference light on the holographic optical element 130 in which a plurality of signal light beams have been recorded using one reference light beam, a plurality of images having different focal points may be output as signal light beams from the holographic optical element 130. The plurality of images output from the holographic optical element 130 may be substantially the same as the image incident on the holographic optical element 130. That is, the optical characteristics of the plurality of output images may be the same as the optical characteristics of the incident image. In addition, the plurality of output images may be focused on different points.

The plurality of images may be focused on the same plane, for example, the same focal plane. The center of the plurality of focused images may also be arranged on the focal plane.

The distance d between focused images P1, P2, P3, and P4 may be equal to or greater than the pupil size of a user (e.g., a predetermined pupil size). For example, the distance d between the focused images P1, P2, P3, and P4 may be within a range of about 1 mm to 10 mm. When the distance d between the focused images P1, P2, P3, and P4 is less than the pupil size of a user, the focused images P1, P2, P3, and P4 may pass through one pupil, causing a situation in which the user simultaneously views the same images. In addition, when the distance d between the focused images P1, P2, P3, and P4 is excessively great, a black zone in which no image exists may increase in an image observable region. Therefore, the distance d between the focused images P1, P2, P3, and P4 may be adjusted to be equal to or greater than the pupil size of a user but equal to or less than three times the pupil size of the user.

As described above, because the holographic optical element 130 outputs a plurality of images having different focal points when a single image is input to the holographic optical element 130, when an eye of a user is positioned at one of the focal points, the user may view the image. Because a plurality of focused images, for example, the focused images P1, P2, P3, and P4, are provided, there are a plurality of points at which images may be observed, and thus an image observable region (eye box) or a field of view may be expanded.

In addition, the center of the plurality of focused images may also be adjusted by adjusting the direction of the image incident on the holographic optical element 130, for example, by adjusting a tile angle and a deflection direction of the image deflector 120. For example, the center of the plurality of focused images may be biaxially adjusted by biaxially adjusting the direction of an image incident on the holographic optical element 130. Therefore, the image observable region or the field of view may be further expanded by adjusting the direction of an image with respect to the holographic optical element 130. This direction adjustment may be performed by the image deflector 120.

The image deflector 120 may deflect an image by reflecting light incident from the image generator 110 toward the holographic optical element 130. The image deflector 120 may be biaxially driven by various driving structures. For example, when a user's eye (e.g., a user's pupil) moves within an XY plane, the image deflector 120 may be driven to change the propagation direction of light in X and Y directions by adjusting an X direction angle $\theta_x$ and a Y direction angle $\theta_y$.

Figure 2A:
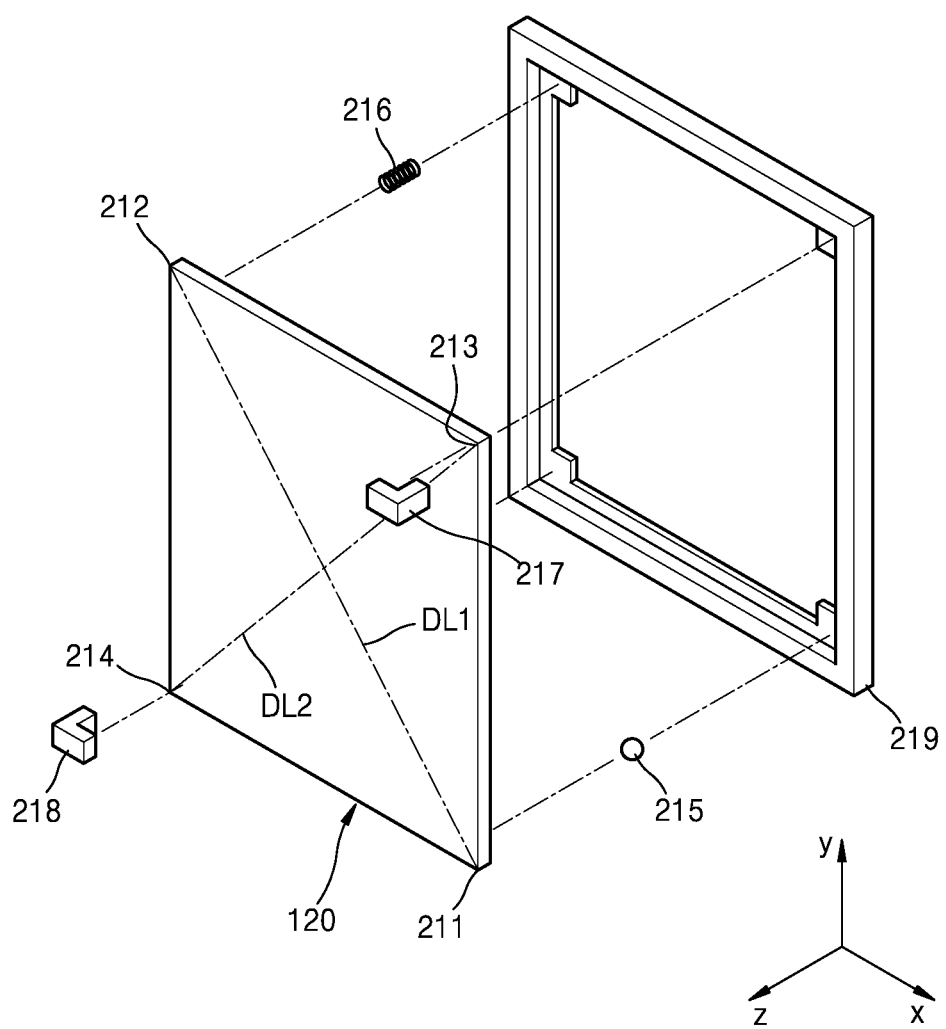
FIG. 2A is an exploded perspective view illustrating an example structure for biaxially driving an image deflector.
Figure 2B:
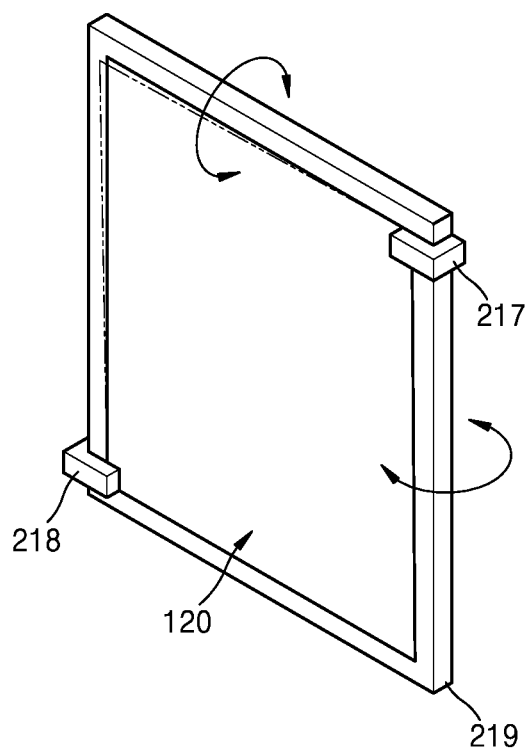
FIG. 2B is a perspective view illustrating the example structure for biaxially driving the image deflector shown in FIG. 2A.

FIG. 2A is an exploded perspective view illustrating an example structure for biaxially driving the image deflector 120, and FIG. 2B is a perspective view illustrating the example structure for biaxially driving the image deflector 120 shown in FIG. 2A. Referring to FIGS. 2A and 2B, the image deflector 120 is supported on a frame 219 to be biaxially driven. For example, a first corner 211 of the image deflector 120 is pivotally supported by a support 215. The support 215 may include, for example, a spherical body or a ball joint structure arranged between the frame 219 and the first corner 211 of the image deflector 120. An elastic support 216 may elastically support a second corner 212 of the image deflector 120. The second corner 212 may face the first corner 211 in the direction of a first diagonal line DL1. For example, the elastic support 216 may include a compression spring arranged between the second corner 212 of the image deflector 120 and the frame 219.

For example, the elastic support 216 may elastically support the second corner 212 in a Z direction. First and second actuators 217 and 218 may respectively move third and fourth corners 213 and 214 of the image deflector 120. The third and fourth corners 213 and 214 are arranged in the direction of a second diagonal line DL2 crossing the first diagonal line DL1. Various driving structures such as a voice coil motor or a shape memory alloy and a heater for heating the shape memory alloy may be employed as the first and second actuators 217 and 218.

For example, the first and second actuators 217 and 218 may move the third and fourth corners 213 and 214 in the Z direction. In addition, the first and second actuators 217 and 218 may move the third and fourth corners 213 and 214 in a direction perpendicular to a plane in which the image deflector 120 is placed. The image deflector 120 may be biaxially pivoted around X and Y axes according to the position of a pupil by adjusting the displacements of the third and fourth corners 213 and 214 to be equal to or different from each other, thereby adjusting the direction in which an image incident on the image deflector 120 is reflected toward the holographic optical element 130.

Figure 3:
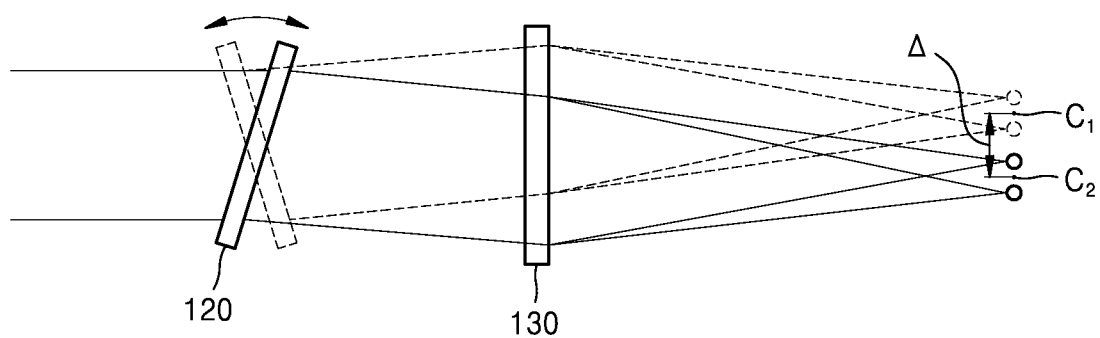
FIG. 3 is a view illustrating the positions of focused images, which vary according to the biaxial driving of the image deflector.

FIG. 3 is a view illustrating the positions of focused images, which vary according to the biaxial driving of the image deflector 120. When the image deflector 120 deflects an image such that the image is incident on the holographic optical element 130 in a first direction, the holographic optical element 130 may output images having different focal points such that the center of focused images P1, P2, P3, and P4 may be at a first position. In addition, when the image deflector 120 deflects an image such that the image is incident on the holographic optical element 130 in a second direction, the holographic optical element 130 may output images having different focal points such that the center of focused images P1, P2, P3, and P4 may be at a second position.

Movements of the focused images P1, P2, P3, and P4 may be determined by a hologram pattern recorded using reference light and signal light. The focused images P1, P2, P3, and P4 may be moved on the same plane, for example, on the same focal plane. Variations in the positions of the focused images P1, P2, P3, and P4 may be proportional to the degree of variation in the propagation direction of the image incident on the holographic optical element 130. To prevent the focused images P1, P2, P3, and P4 from passing through a pupil while overlapping each other, the moving distances of the focused images P1, P2, P3, and P4, that is, variations A in the center positions $C_1$ and $C_2$ of the focused images P1, P2, P3 and P4, may be adjusted to be equal to or greater than a user's pupil size. For example, the moving distances of the focused images P1, P2, P3, and P4 may be adjusted to be about 1 mm or more.

The image deflector 120 described with reference to FIGS. 2A to 3 is a reflective-type deflector, but the image deflector 120 is not limited thereto. The image deflector 120 may be of a transmissive type.

Figure 4:
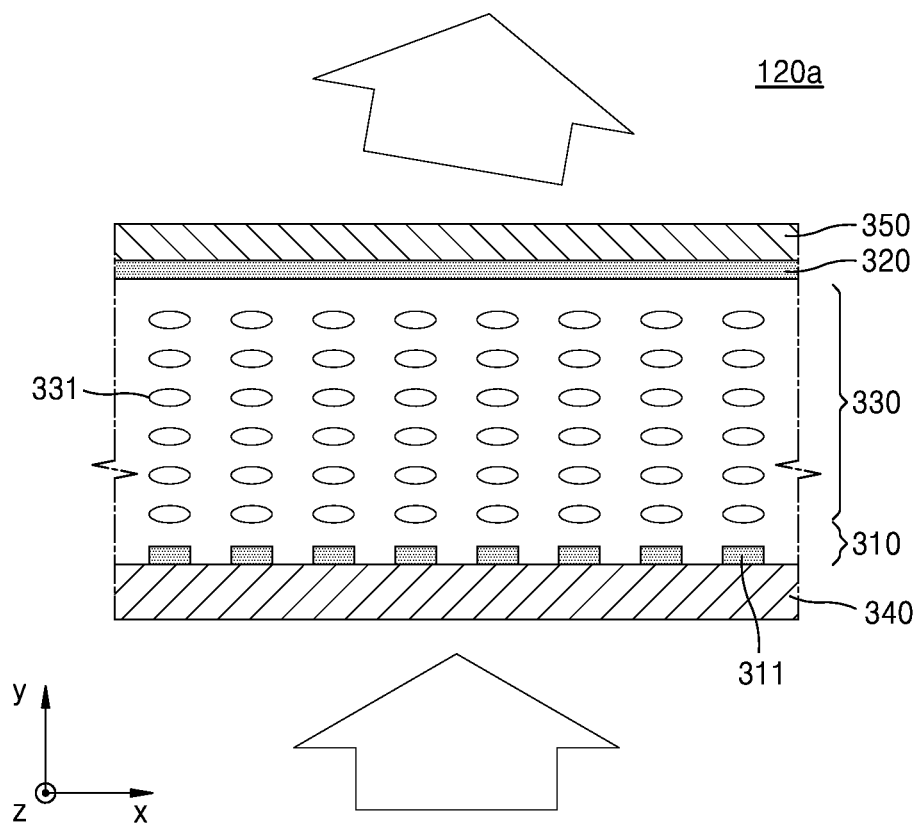
FIG. 4 is a view illustrating an image deflector according to another example embodiment.

FIG. 4 is a view illustrating an image deflector 120a according to another example embodiment. Referring to FIG. 4, the image deflector 120a may include: first and second electrode layers 310 and 320 that face each other with a gap therebetween; and a deflection layer 330 provided between the first and second electrode layers 310 and 320 to deflect incident light according to a voltage applied between the first and second electrode layers 310 and 320. In addition, the image deflector 120a may further include first and second substrates 340 and 350, which respectively support the first and second electrode layers 310 and 320.

The first electrode layer 310 may include a plurality of electrode elements 311, which are apart from each other. The plurality of electrode elements 311 may be formed in a blazed grating pattern. For example, the plurality of electrode elements 311 may be apart from each other and may have a stripe shape. The plurality of electrode elements 311 may be arranged at a constant pitch in a first direction (for example, an X direction). The light diffraction angle or light deflection angle of the image deflector 120a may be increased by reducing the pitch of the plurality of electrode elements 311.

The deflection layer 330 may be arranged between the first electrode layer 310 and the second electrode layer 320. The deflection layer 330 may include liquid crystal molecules 331 of which the orientation is variable by an input voltage. The liquid crystal molecules 331 may be initially arranged such that the longitudinal direction of the liquid crystal molecules 331 may be parallel to one direction, for example, the X direction.

The liquid crystal molecules 331 may be have positive dielectric anisotropy, but are not limited thereto. When voltages are respectively applied to the first electrode layer 310 and the second electrode layer 320, an electric field (E-field) may be formed in the deflection layer 330 between the first electrode layer 310 and the second electrode layer 320. The liquid crystal molecules 331 may be rotated in a direction parallel to the electric field according to the strength of the electric field, that is, the difference between the applied voltages. The phase of light incident on the first substrate 340 may be modulated using this phenomenon. The major axes of the liquid crystal molecules 331 may be rotated according to the electric field formed between the first and second electrode layers 310 and 320 such that the image deflector 120a may function as an electric prism to deflect light in a given direction. Although the liquid crystal molecules 331 have been described as deflection elements, embodiments are not limited thereto. Any elements other than the liquid crystal molecules 331 may be used as long as the elements are capable of deflecting light in response to an applied electrical signal.

The image deflectors 120 and 120a are merely examples, and any optical device capable of adjusting the direction of an image incident on the holographic optical element 130 may be used. For example, a micro-electromechanical systems (MEMS) scanner, a Galvano mirror, a linear spatial light modulator, or the like may be used as the image deflector 120.

The direction of an image incident on the holographic optical element 130 may be adjusted based on results of tracking a user's pupil or a user command.

Figure 5:
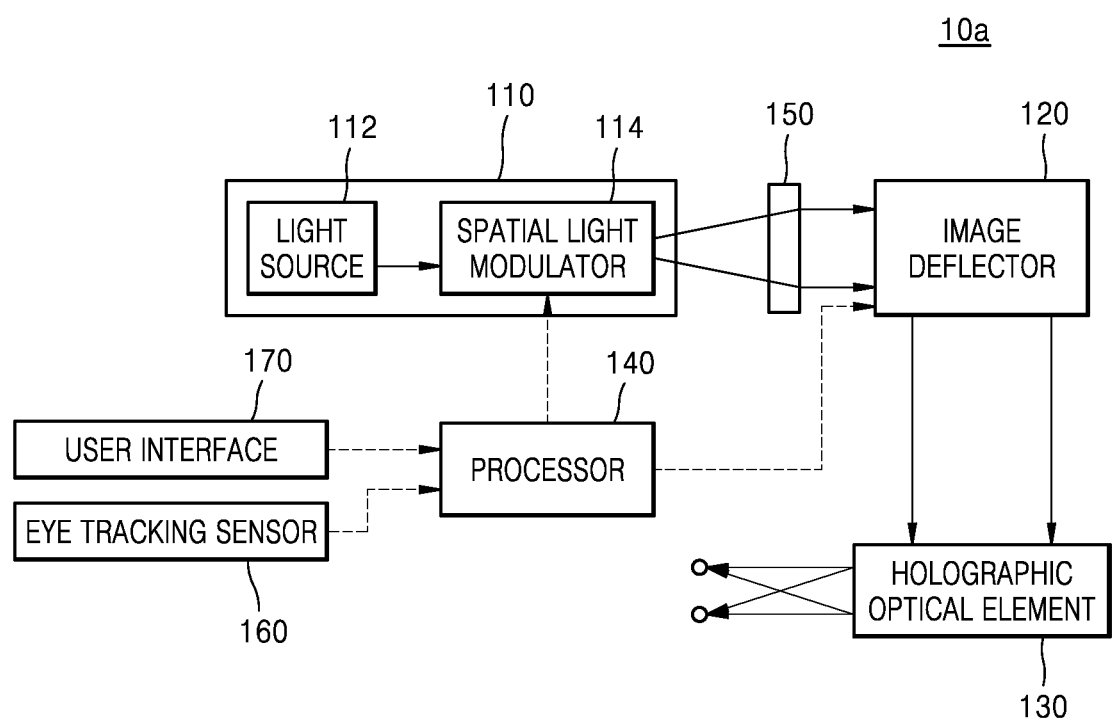
FIG. 5 is a view illustrating a display apparatus according to another example embodiment.

FIG. 5 is a view illustrating a display apparatus 10a according to another example embodiment. Referring to FIG. 5, the display apparatus 10a may further include an eye tracking sensor 160. The eye tracking sensor 160 may transmit information on the position of a user's pupil to a processor 140 by tracking a user's gaze, that is, the movement of the user's pupil, and the processor 140 may control an image deflector 120 to transmit light to the user's pupil according to the information on the position of the user's pupil.

In addition, the display apparatus 10a may further include a user interface 170. The first and second actuators 217 and 218 (refer to FIGS. 2A and 2B) may be driven according to a user input signal, which is input through the user interface 170 such that the image deflector 120 may be pivoted to transmit light to the user's pupil.

Alternatively, the processor 140 may control the image deflector 120 such that the direction of images incident on the holographic optical element 130 may periodically vary with time.

Instead of driving the image deflector 120, the holographic optical element 130 may be driven to adjust the direction of an image incident on the holographic optical element 130.

Figure 6:
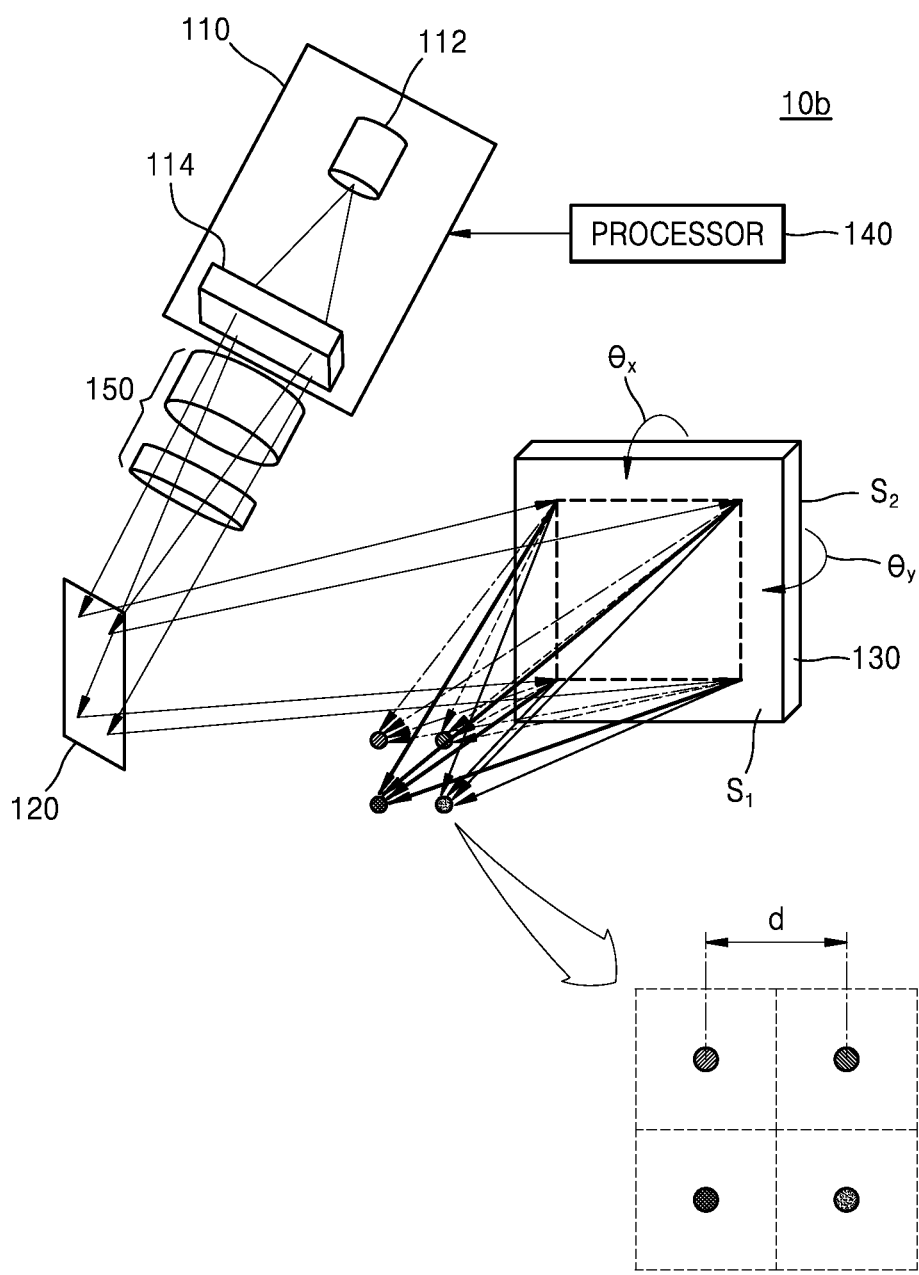
FIG. 6 is a view illustrating a display apparatus including a biaxially drivable holographic optical element according to an example embodiment.

FIG. 6 is a view illustrating a display apparatus 10b including a holographic optical element 130 which is biaxially drivable according an example embodiment. The holographic optical element 130 may be biaxially driven by the driving structure shown in FIGS. 2A and 2B. The positions of focused images may be varied by biaxially driving the holographic optical element 130.

Figure 7:
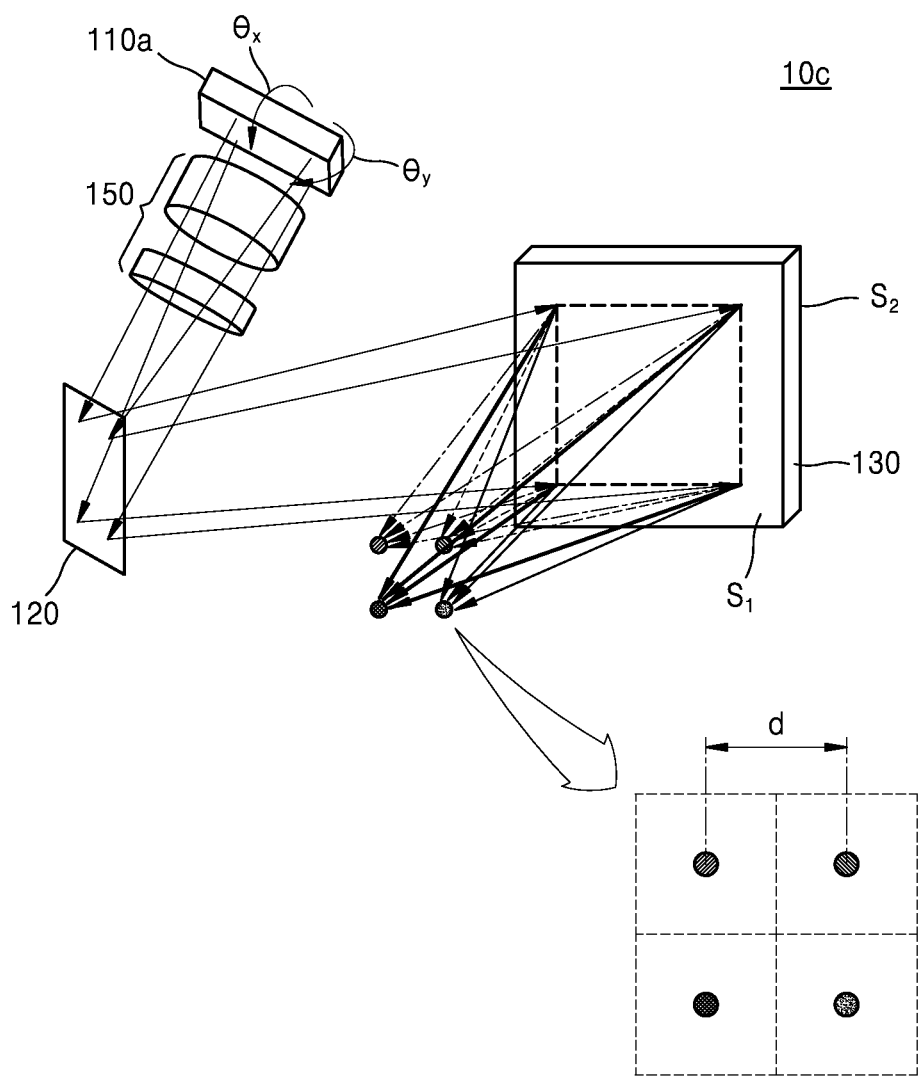
FIG. 7 is a view illustrating a display apparatus including a self-luminous image generator according to an example embodiment.

Alternatively, an image generator 110 may be configured to adjust the direction of an output image. FIG. 7 is a view illustrating a display apparatus 10c including a self-luminous image generator 110a according to an example embodiment. The self-luminous image generator 110a may generate an image by adjusting the amount of light emitted from a light source. For example, the self-luminous image generator 110a may be a micro display apparatus including micro light sources. The divergence angle of light emitted from the self-luminous image generator 110a may be about five degrees or less. When the straightness of light emitted from the self-luminous image generator 110a is high, an optical system 150 may not be required. An image deflector 120 may be biaxially driven to adjust the propagation direction of an image.

Figure 8:
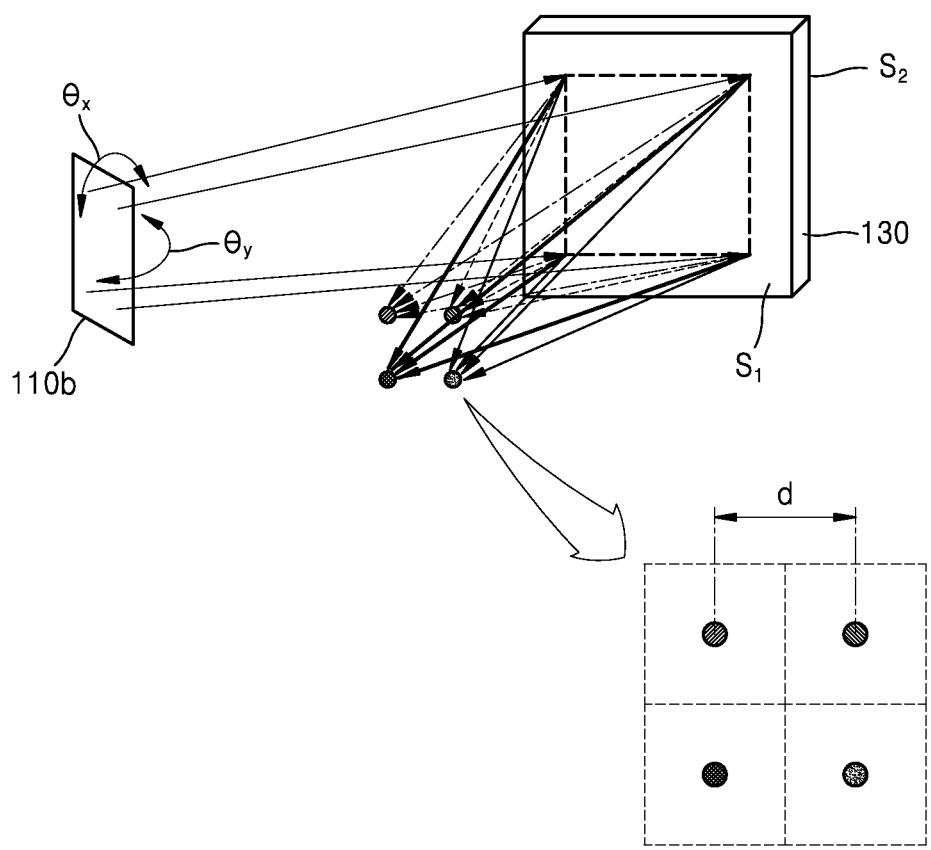
FIG. 8 is a view illustrating a display apparatus including a self-luminous image generator capable of deflecting an image, according to an example embodiment.

Alternatively, the self-luminous image generator 110a may be integrated with the image deflector 120. FIG. 8 is a view illustrating a display apparatus 10d including a self-luminous image generator 110b capable of deflecting an image according to an example embodiment. Referring to FIG. 8, the display apparatus 10d may include: the self-luminous image generator 110b configured to output an image by emitting light; and a holographic optical element 130 configured to focus a plurality of images on different points in response to the image incident from the self-luminous image generator 110b.

The self-luminous image generator 110b may generate an image using light having high straightness, for example, light having a divergence angle of about five degrees or less. In addition, a self-luminous image may be biaxially driven to adjust the direction of the self-luminous image incident on the holographic optical element 130. The display apparatus 10d may be simplified using the self-luminous image generator 110b, which is biaxially drivable. Furthermore, instead of biaxially driving the self-luminescence image generator 110b, the holographic optical element 130 may be biaxially driven.

Figure 9:
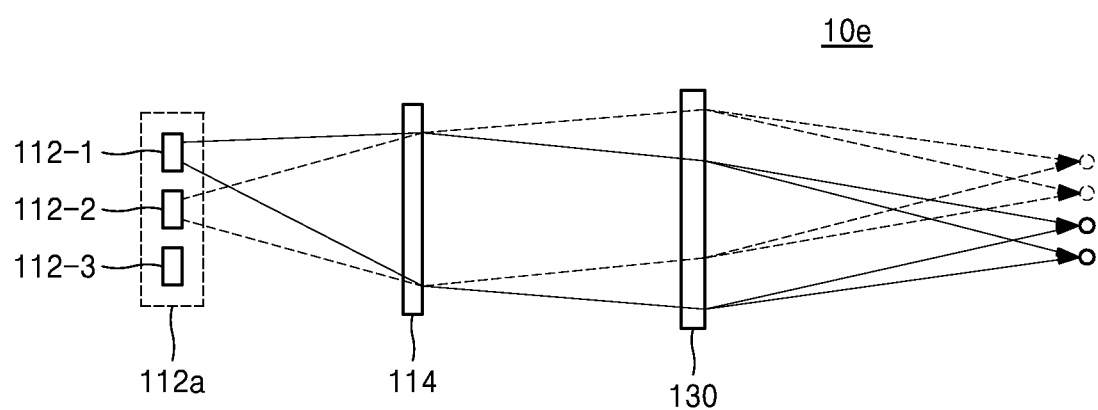
FIG. 9 is a view illustrating a display apparatus including a plurality of light sources according to an example embodiment.

FIG. 9 is a view illustrating a display apparatus including a plurality of light sources 112a according to an example embodiment. Referring to FIG. 9, the display apparatus 10e may include: a plurality of light sources 112a each configured to emit light and including a first light source 112-1, a second light source 112-2, and a third light source 112-3; a spatial light modulator 114 configured to generate an image using light emitted from any one of the plurality of light sources 112a; and a holographic optical element 130 configured such that when the image generated by the spatial light modulator 114 is incident on the holographic optical element 130, the holographic optical element 130 focuses a plurality of images corresponding to the incident image on different points. The display apparatus 10e may further include a processor 140 configured to control the plurality of light sources 112a and the spatial light modulator 114.

One or more of the plurality of light sources 112a may be selectively driven through control by the processor 140. The plurality of light sources 112a may be spatially apart from each other such that light beams from the plurality of light sources 112a may propagate along different paths. In other words, the plurality of light sources 112a may provide light in wavelength bands for generating images at different positions. In FIG. 9, each of the plurality of light sources 112a is constituted by one unit, but embodiments are not limited thereto. For example, each of the plurality of light sources 112a may include a plurality of lasers or an array of LEDs.

According to image information, the spatial light modulator 114 may modulate light emitted from any one of the plurality of light sources 112a. When the processor 140 selects and drives one or more of the plurality of light sources 112a, the processor 140 controls a modulation signal to be applied to the spatial light modulator 114 in synchronization with the one or more light sources. Images generated by the spatial light modulator 114 may travel in different directions according to the plurality of light sources 112a and may be incident on the holographic optical element 130 in different directions.

When one image is incident as reference light on the holographic optical element 130, the holographic optical element 130 focuses a plurality of images corresponding to the image on different points. The center of the plurality of focused images may vary according to the direction of the image incident on the holographic optical element 130.

Among the plurality of light sources 112a, a light source, which forms a focus at a user's pupil position, may be selected as a driving light source by the processor 140 based on results of tracking of a user's gaze.

After selecting the driving light source, the processor 140 may turn off the other light sources and turn on only the selected driving light source such that the spatial light modulator 114 may form an image using light from the selected driving light source.

The direction of an image incident on the holographic optical element 130 may be adjusted by selecting any one of the plurality of light sources 112a. For example, when the first light source 112-1 is turned on and the second and third light sources 112-2 and 112-3 are turned off, the spatial light modulator 114 may generate the image based on light emitted from the first light source 112-1, and the image may be incident on the holographic optical element 130 in a first direction. The holographic optical element 130 may focus the plurality of images such that the center of the plurality of images may be at a first position. In addition, when the second light source 112-2 is turned on and the first and third light sources 112-1 and 112-3 are turned off, the spatial light modulator 114 may generate the image based on light emitted from the second light source 112-2, and the image may be incident on the holographic optical element 130 in a second direction. The holographic optical element 130 may focus the plurality of images such that the center of the plurality of images may be at a second position.

When the direction of an image incident on the holographic optical element 130 is controlled by biaxially pivoting at least one of an image generator 110, an image deflector 120, and the holographic optical element 130, image distortion may occur because of the biaxial pivoting.

Figure 10A:
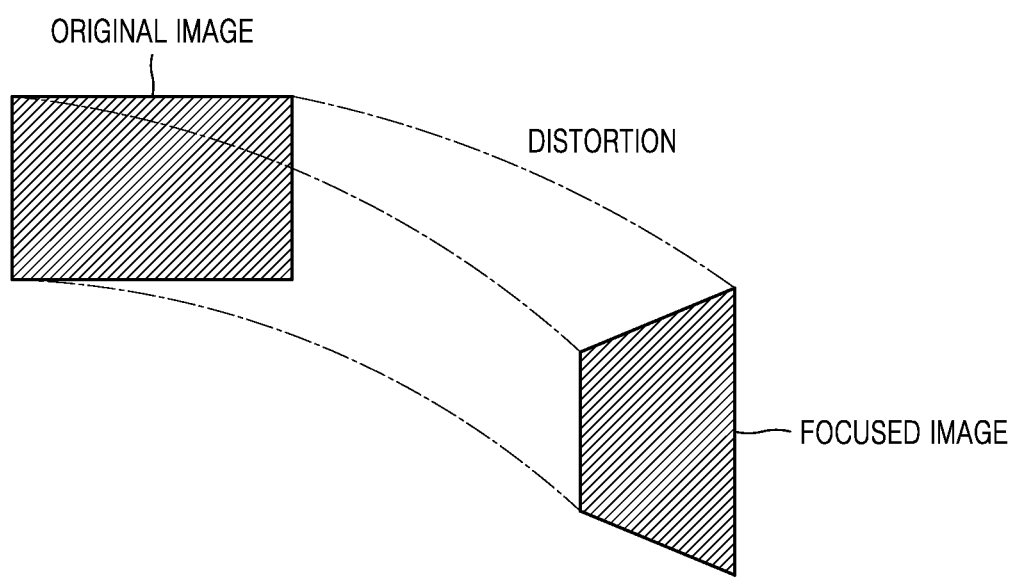
FIGS. 10A to 10C are reference views illustrating an algorithm for compensating for image shape distortion according to an example embodiment.
Figure 10B:
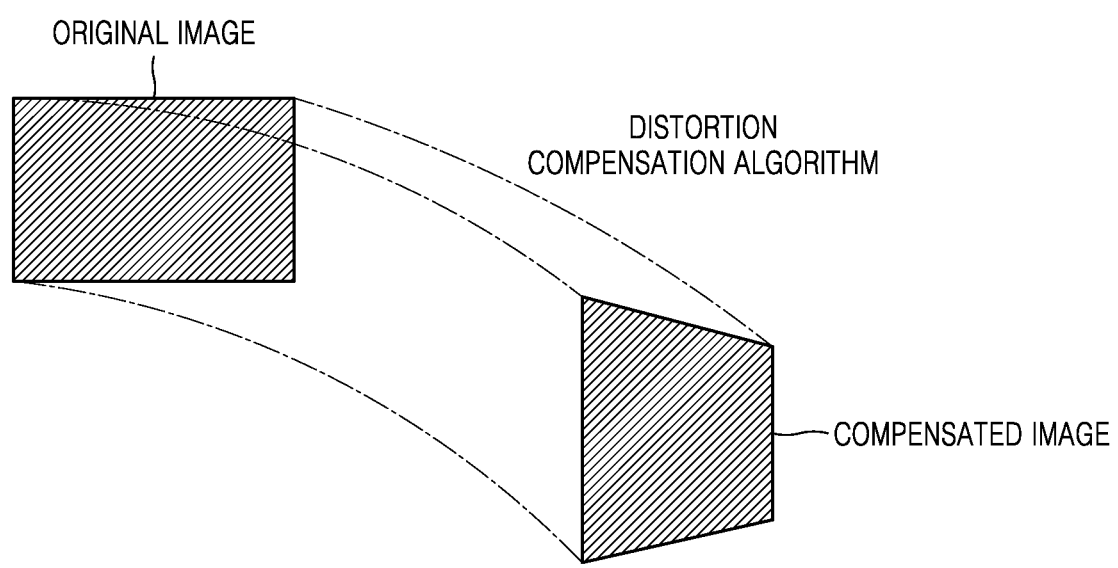
Figure 10C:
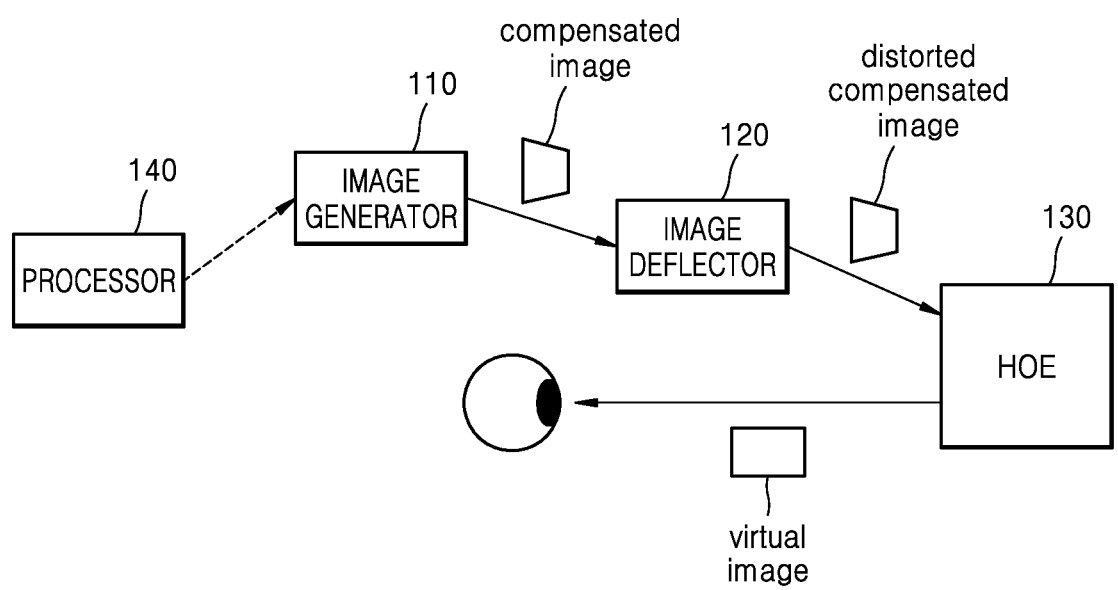

FIGS. 10A to 10C are reference views illustrating an algorithm for compensating for image shape distortion according to an example embodiment. Referring to FIGS. 10A to 10C, a processor 140 may acquire a mapping algorithm from one-to-one mapping between pixel position information (which may be referred to as "image information") on an original image and pixel position information on focused images P1, P2, P3, and P4. To acquire the mapping algorithm, an image sensor of a display apparatus 10 may be arranged at the position of an observer's eye to obtain the focused images P1, P2, P3, and P4. Then, the processor 140 may acquire a distortion compensation algorithm by inversely transforming the mapping algorithm.

Then, referring to FIG. 10B, the processor 140 may apply the distortion compensation algorithm to the original image based on pixel information of the image information, and may apply image information, to which the distortion compensation algorithm is applied, to a spatial light modulator 114. The spatial light modulator 114 may generate an image (e.g., a compensated original image) by modulating light based on the image information to which the distortion compensation algorithm is applied.

Referring to FIG. 10C, the shape of the compensated image may be distorted while the compensated image proceeds through an image deflector 120 and a holographic optical element 130, and thus the shape of the compensated image changes to have the same shape or substantially the same shape as that of the original image, since the original image is pre-compensated before being distorted by the image deflector 120 and the holographic optical element 130. The image output from the holographic optical element 130 may be incident on an observer's eye as a virtual image for which shape distortion illustrated in FIG. 10A is compensated.

The mapping algorithm may be obtained from a pixel-based relationship between the focused images P1, P2, P3, and P4 and the original image (or image information), but is not limited thereto. The mapping algorithm may be obtained from a relationship between some pixels of the focused images P1, P2, P3, and P4 and pixels of the original image corresponding to the pixels of the focused images P1, P2, P3, and P4, and the distortion compensation algorithm may be based on positional information on the pixels of the focused images P1, P2, P3, and P4. In addition, the processor 140 may obtain compensated image information by applying the distortion compensation algorithm to some pixels of the original image (or image information) and then applying a linear interpolation method to the remaining pixels of the original image.

Figure 11:
FIGS. 11 to 13 are views illustrating various electronic devices employing the display apparatuses of the example embodiments.
Figure 12:
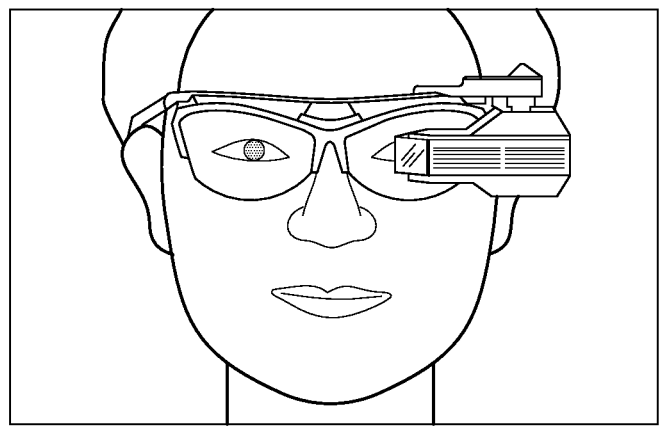
Figure 13:
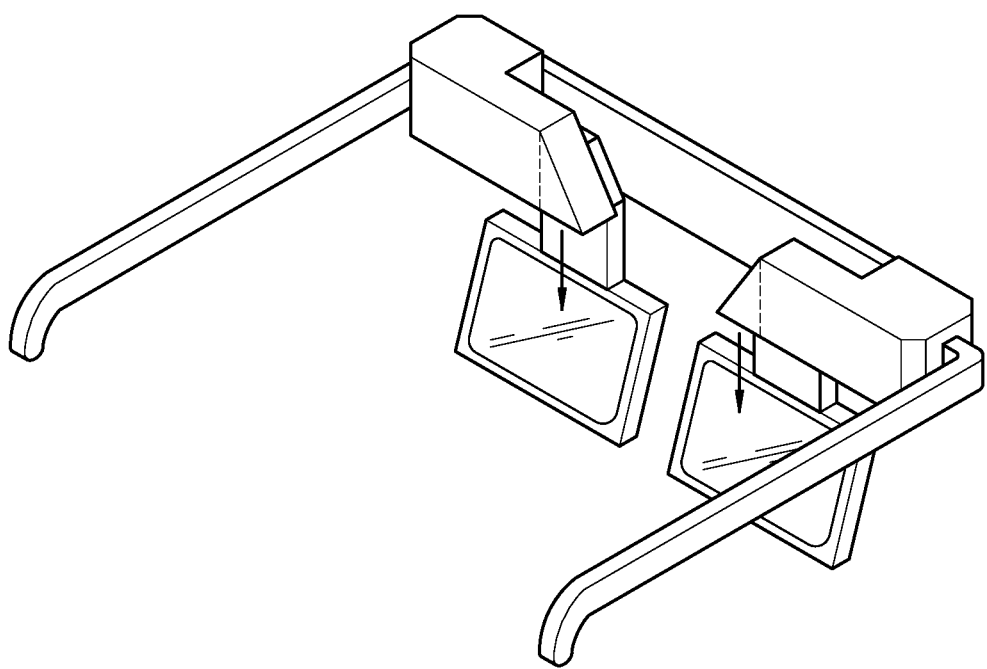

FIGS. 11 to 13 illustrate various electronic devices employing the display apparatuses of the embodiments described above. As shown in FIGS. 11 to 13, the display apparatuses may be applied to wearable devices. For example, the display apparatuses may be applied to head-mounted displays (HMDs). In addition, the display apparatuses may be applied to glasses-type displays, goggle-type displays, or the like. The wearable devices shown in FIGS. 11 to 13 may be operated in conjunction with smartphones. The display apparatuses may be VR, AR, or MR display apparatuses of a head-mounted type, a glasses-type, or a goggles-type, which are capable of providing VR or VR images together with real images of the external environment.

In addition, the display apparatuses may be provided in smartphones, and the smartphones themselves may be used as display apparatuses. That is, instead of applying the display apparatuses to wearable devices as shown in FIGS. 11 to 13, the display apparatuses may be applied to small electronic devices (mobile electronic devices). In addition, the display apparatuses may be used in various fields. For example, the display apparatuses may be used in various fields in addition to being used to implement VR, AR, or MR. For example, the display apparatuses may be applied to small televisions or small monitors, which users may wear.

As described above, according to the one or more of the above embodiments, the display apparatuses may provide multiple images having 3D effects together with an actual external view such that users may experience more realistic AR.

In addition, the display apparatuses may provide an expanded observable area.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a processor;
an image generator comprising:
   a plurality of spatially separated light sources configured such that light beams emitted from the plurality of spatially separated light sources propagate along different paths; and
   a spatial light modulator configured to generate images using light from at least one of the plurality of spatially separated light sources;
a holographic optical element configured, for each of the generated images that is incident on the holographic optical element, output a plurality of images corresponding to each of the generated images at spatially different points by focusing each of the generated images on the spatially different points;
an image deflector provided in an optical path between the image generator and the holographic optical element, and configured to deflect each of the generated images received from the image generator to the holographic optical element; and
an eye tracking sensor configured to track a user's gaze, wherein:
the holographic optical element is biaxially driven to adjust a deflection direction of the image deflector,
for each of the generated images that is incident on the holographic optical element in an adjusted deflection direction, the holographic optical element focuses the plurality of images two-dimensionally onto a same focal plane while simultaneously adjusting positions of each of the plurality of images according to the adjusted deflection direction and adjusting a center of the plurality of images according to the adjusted deflection direction, and
while the positions of each of the plurality of images are simultaneously adjusted, a distance between the plurality of images is maintained to be greater than or equal to a predetermined pupil size and less than or equal to three times the predetermined pupil size, and a distance between the center of the plurality of images before and after an adjustment of the positions of each of the plurality of images, is made greater than or equal to the predetermined pupil size, and
wherein the processor is configured to selectively activate one or more of the plurality of spatially separated light sources based on the on tracking results received from the eye tracking sensor and to control a modulation signal applied to the spatial light modulator in synchronization with the selectively activated one or more light sources, such that the images generated by the spatial light modulator are projected in different directions and are incident on the holographic optical element from different angles.

2. The display apparatus of claim 1, wherein the generated images and the plurality of images have substantially identical optical characteristics.

3. The display apparatus of claim 1, wherein the holographic optical element is configured such that:
   when each of the generated images is incident on the holographic optical element in a first direction, the holographic optical element focuses the plurality of images such that the center of the plurality of images is at a first position; and
   when each of the generated images is incident on the holographic optical element in a second direction that is different from the first direction, the holographic optical element focuses the plurality of images such that the center of the plurality of images is at a second position that is different from the first position.

4. The display apparatus of claim 3, wherein the first position and the second position are located on an identical focal plane.

5. The display apparatus of claim 3, wherein a distance between the first position and the second position is greater than or equal to a user's pupil size.

6. The display apparatus of claim 1, further comprising an optical system comprising one or more lenses,
   wherein the optical system is provided between the image generator and the image deflector and configured to cause all light included in the generated images output from the image generator to be incident on the image deflector.

7. The display apparatus of claim 1, wherein the holographic optical element comprises:
   a first surface on which generated images are incident and from which the plurality of images are output; and
   a second surface which is opposite to the first surface and on which external light corresponding to an external environment is incident.

8. The display apparatus of claim 1, wherein the image generator is integrated with the image deflector.

9. The display apparatus of claim 1, wherein the holographic optical element comprises:
   a reflective surface configured to output the plurality of images when the generated images are incident from the image deflector;
   a frame that supports the reflective surface;
   a first supporting structure positioned between the frame and a first corner of the holographic optical element, to pivotally support the first corner of the holographic optical element; and
   a second supporting structure positioned between the frame and a second corner of the holographic optical element, to elastically support the second corner of the holographic optical element,
   wherein the first corner and the second corner are located diagonally across from each other on the reflective surface.

10. The display apparatus of claim 1, wherein the processor is further configured to apply a distortion compensation algorithm to image information, which is used by the image generator to generate the plurality of images, to compensate for image shape distortion caused by a biaxial drive mechanism.

11. The display apparatus of claim 10, wherein the distortion compensation algorithm is performed by inversely transforming a mapping algorithm that maps pixel position information included in the image information to pixel position information included in the plurality of images focused by the holographic optical element.

12. The display apparatus of claim 10, wherein the processor is further configured to periodically vary the deflection direction with time by controlling at least one of the image generator, the image deflector, and the holographic optical element.

13. The display apparatus of claim 1, wherein the holographic optical element comprises:
- a reflective surface configured to output the plurality of images when the generated images are incident from the image deflector; and
- a pair of actuators positioned at two diagonally opposite corners of the reflective surface and configured to move the two diagonally opposite corners to adjust a surface geometry of the reflective surface.

14. A method of controlling a display apparatus, the method comprising:
- receiving a result of tracking a user's gaze from an eye-tracking sensor
- emitting light from a plurality of spatially separated light sources to propagate along different paths;
- generating images by controlling the plurality of spatially separated light sources configured such that light beams emitted from the plurality of spatially separated light sources propagate along different paths, and controlling a spatial light modulator configured to generate the images using light from at least one of the plurality of spatially separated light sources, wherein the generating of the image comprises: selectively activating one or more of the plurality of spatially separated light sources based on the result of tracking the user's gaze and controlling a modulation signal applied to the spatial light modulator in synchronization with the selectively activated one or more light sources, such that the images generated by the spatial light modulator are projected in different directions and are incident on a holographic optical element from different angles;
- projecting the generated images to an image deflector by using light; and
- deflecting each of the generated images to spatially different points on a surface of the holographic optical element, by adjusting a tilt angle of the image deflector, to generate a plurality of images corresponding to each of the generated images at the spatially different points, wherein:
the deflection angle adjustment is performed by adjusting the tilt angle of the image deflector and by biaxially driving the holographic optical element,
for each of the generated images that is incident on the holographic optical element in an adjusted deflection direction, the holographic optical element focuses the plurality of images two-dimensionally onto a same focal plane while simultaneously adjusting while simultaneously adjusting positions of each of the plurality of images according to the adjusted deflection direction and adjusting a center of the plurality of images according to the adjusted deflection direction, and
while the positions of each of the plurality of images are simultaneously adjusted, a distance between the plurality of images is maintained to be greater than or equal to a predetermined pupil size and less than or equal to three times the predetermined pupil size, and a distance between the center of the plurality of images before and after an adjustment of the positions of each of the plurality of images, is made greater than or equal to the predetermined pupil size.

* * * * *